C. P. DELO.
TRACTOR.
APPLICATION FILED MAR. 21, 1917.
1,266,774.
Patented May 21, 1918.
2 SHEETS—SHEET 1.
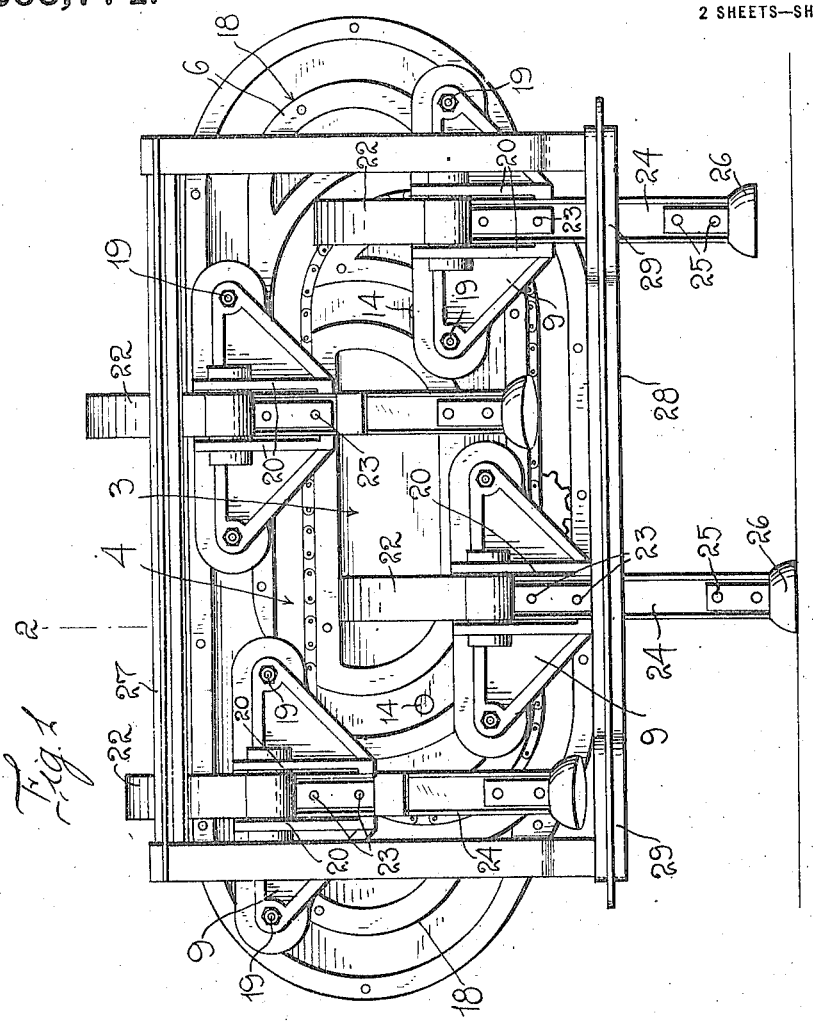
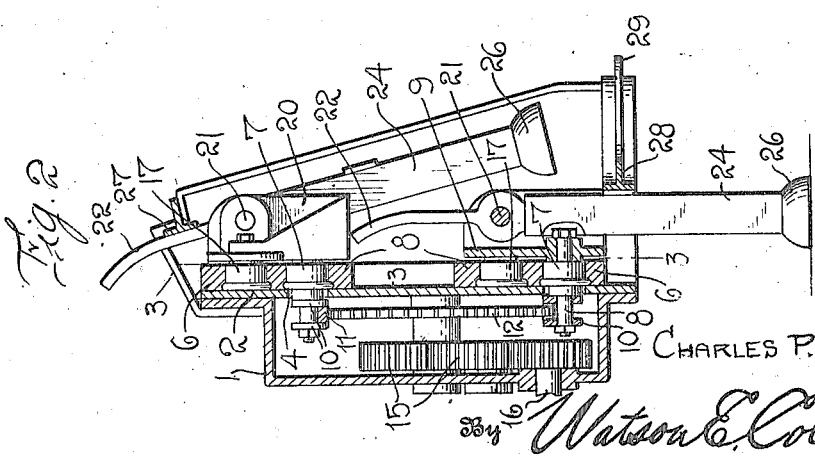
Inventor
CHARLES P. DELO
By Watson E. Coleman
Attorney

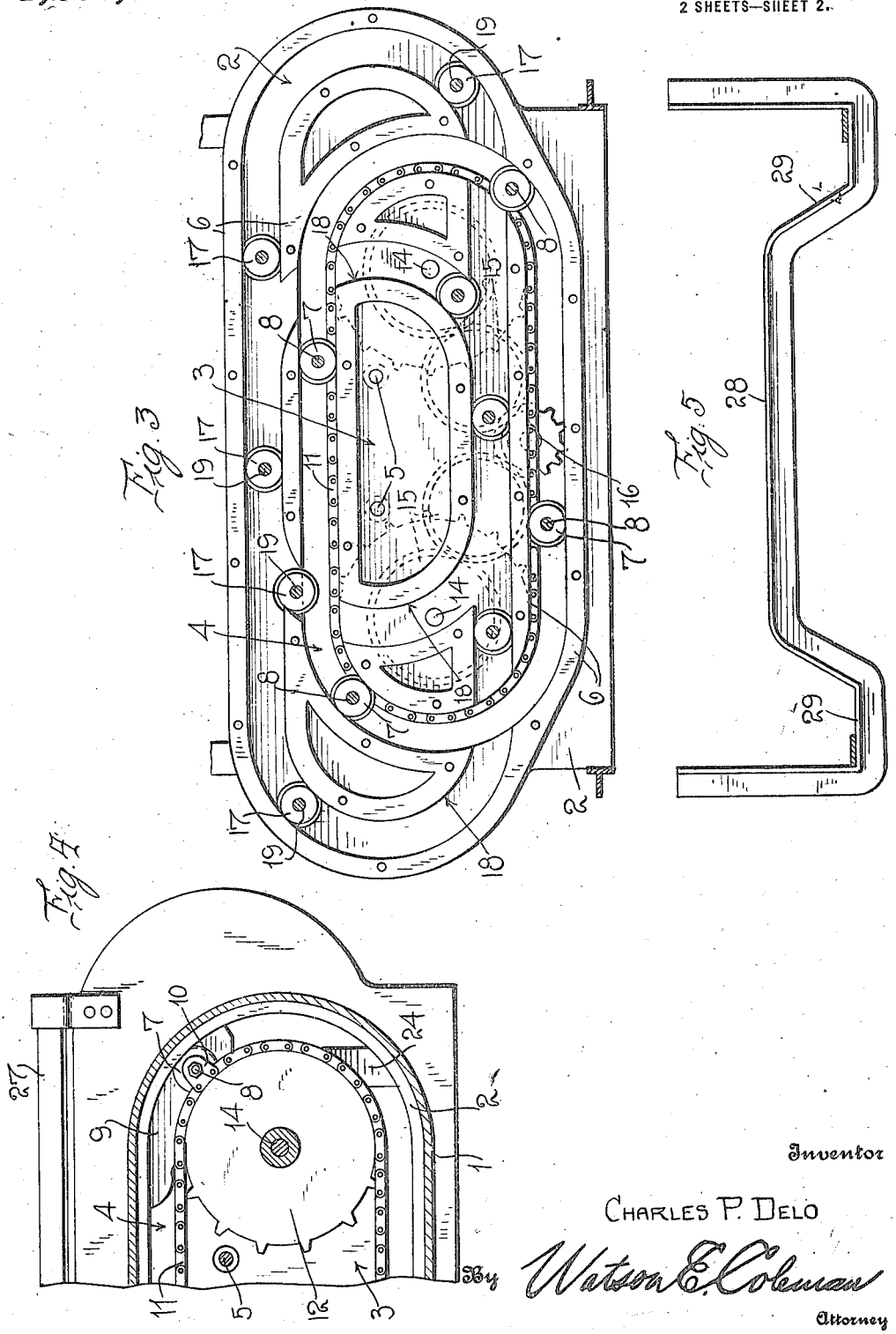

UNITED STATES PATENT OFFICE.

CHARLES P. DELO, OF SHIPPENSVILLE, PENNSYLVANIA.

TRACTOR.

1,266,774.

Specification of Letters Patent.

Patented May 21, 1918.

Application filed March 21, 1917. Serial No. 156,393.

*To all whom it may concern:*

Be it known that I, CHARLES P. DELO, a citizen of the United States, residing at Shippensville, in the county of Clarion and State of Pennsylvania, have invented certain new and useful Improvements in Tractors, of which the following is a specification, reference being had to the accompanying drawings.

This invention relates to certain improvements in tractors and has relation more particularly to a device of this general character of a stepper type; and an object of the invention is to provide a novel and improved mechanism whereby the tractor may be propelled with convenience and facility irrespective of the condition of the surface over which the same is intended to travel.

It is also an object of the invention to provide a novel and improved tractor including a plurality of ground engaging members having coacting therewith means for causing said members to assume substantially a vertical position when in operative engagement with the surface over which the tractor is traveling and whereby said ground engaging member, when in contact with the surface, is effectively held in such substantially vertical position.

Furthermore the invention has for an object to provide a novel and improved tractor which includes an endless member with which are operatively engaged a plurality of ground engaging members together with means for imparting lateral movement to the members out of engagement with the surface with which the tractor coacts so that said inoperative members will offer no obstruction to the ground engaging members in contact with the surface.

The invention consists in the details of construction and in the combination and arrangement of the several parts of my improved tractor whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in side elevation of a tractor constructed in accordance with an embodiment of my invention;

Fig. 2 is a sectional view taken substantially on the line 2—2 of Fig. 1;

Fig. 3 is a sectional view taken substantially on the line 3—3 of Fig. 2;

Fig. 4 is a fragmentary view partly in section and partly in rear elevation of the device as herein embodied; and Fig. 5 is a fragmentary view partly in top plan and partly in section illustrating a guide member as herein disclosed and which coacts with the ground engaging members for holding said members against outward movement when the same are in contact with the surface with which the tractor coacts.

In practice it is intended that my improved tractor comprise substantially duplicate members adapted to be positioned longitudinally of a vehicle at opposite sides thereof, but for the purposes of disclosure I am describing and illustrating only one of said sections or members.

As disclosed in the accompanying drawings, 1 denotes a casing of predetermined dimensions and which is adapted to be anchored in applied position in any desired manner and which has its outer side face open and coacting with the open face of said casing 1 is a plate 2 having its central portion provided with an elongated opening and in which opening is positioned a plate 3, the marginal portions of the plate 3 being spaced from the marginal portions of the opening of the plate 2 to define a continuous slot 4, the ends of which being substantially semi-circular in form. The plate 3 is adapted to be secured to the casing 1 in any desired manner and preferably through the medium of the bolts 5 as indicated in Fig. 3. These bolts 5 are omitted in Fig. 2 for clarity in disclosure.

The outer margins of the slot 4 are defined by the tracks 6 between which is mounted the roller 7 mounted on the shaft or rod 8 disposed through the lower or apex portion of the substantially V-shaped plate 9. The shaft or rod 8 extends through the slot 4 and is anchored to the plates 10 interposed in the endless sprocket chain 11.

The chain 11 is directed around and operatively engaged with the sprocket wheels 12 fixed to the shafts 14 positioned at the axial centers of the rounded ends of the slot 4 and the radii of said sprockets 12 is substantially equal to the main radii of said rounded or curved ends of the slot.

The shafts 14 are rotatably supported by the casing 1 and the plate 3. As herein embodied, the shafts 14 are operatively engaged through the medium of the gears 15 with the driven shaft 16 whereby the sprockets 12 are caused to rotate at the same peripheral speed and in the same general direction.

The upper portion of the plate 9 is provided adjacent its opposite ends with the rollers 17 adapted to ride in the trackways 18 of the same configuration and dimensions as the travel afforded by the tracks 6. The trackways 18 are in longitudinal alinement and have their adjacent end portions in overlying relation, and said trackways 18 extend beyond opposite ends of the trackway afforded by the tracks 6.

Each of the rollers 17 is adapted to travel in a single trackway 18 whereby it will be perceived that the plate 9 has its longitudinal axis parallel to the longitudinal axes of the trackways 18 at all times. It is also to be noted that the trackways 18 are offset upwardly relatively to the trackway afforded by the tracks 6 a distance equal to the space between the horizontal planes occupied by the axial center of the shaft or rod 8, and the shafts or rods 19 upon which the rollers 17 are mounted.

As is also clearly indicated in Fig. 3, it is to be noted that the inner curved portions of the trackways 18 intersect the upper stretch of the trackway afforded by the tracks 6.

Each of the plates 9 at substantially its longitudinal center is provided with the outstanding transversely disposed flanges 20 arranged in predetermined spaced relation longitudinally of the plate and pivotally engaged between said flanges adjacent the upper ends thereof and through the medium of the bolt 21 is the upstanding arm 22. The lower portion of the arm 22 and at a point below the pivotal connection as afforded by the bolt 21 is operatively engaged, as indicated at 23, with an elongated leg 24 preferably H-shape in cross section.

The lower end portion of the leg 24 has secured thereto, as at 25, the foot 26 of any suitable material and which is adapted to engage the surface over which the device is to travel. The foot 26 may be of any suitable material and of any desired dimensions and if preferred the lower or engaging face of the foot may be provided with a removable plate to compensate for wear or to provide means whereby a cushion can be applied to the engaging face of the foot 26 when the device is traveling over city streets or highways in good condition.

The arm 22 is disposed on a predetermined curvature and as the leg 24 is elevated the upper or free end portion of the arm 22 contacts with the elongated and horizontally disposed rail 27 which results in the lower end portion of the leg 24 being swung outwardly, as particularly indicated in Fig. 2 so that the leg when lifted or in inoperative position will afford no hindrance or obstruction to a leg 24 and its concomitant parts which is in operative engagement with a surface or roadway.

The leg 24 assumes substantially a vertical position by gravity and after its arm 22 has passed beyond an end of the rail 27. As the leg 24 comes downwardly for contact with the surface or roadway it is adapted to coact with a second guide rail 28 suitably supported by the casing 1 or other suitable portions of the device. The rail 28 serves to hold the leg 24, while in contact with the surface or roadway, against outward swinging movement so that it will maintain its vertical position throughout the entire period in which it is in operative contact with the surface or roadway. It will also be understood that the flanges 20 will serve to hold the leg 24 against any undue rocking movement longitudinally of the plate 9 and whereby the bolt 21 is relieved of torsional strain.

As is particularly illustrated in Fig. 5, it is to be noted that the opposite end portions of the rail 28 are offset outwardly, as indicated at 29, so that no obstruction will be offered by a foot 26 to the descent or ascent of a leg 24.

While it is believed self-evident from the foregoing description, I wish to call particular attention to the fact that the trackways 6 and 18 occupy substantially the same vertical plane and that adjacent end portions of the straight parts of the trackways 18 are common to each other.

It is also to be noted that in the present embodiment of my invention I employ four legs 24 and that said legs or more particularly the plates 9 thereof are so spaced as to assure a foot 26 to be in contact at all times with the surface or roadway. It will also be self-evident that by having the longitudinal axis of each of the plates 9 substantially horizontal at all times, the coacting leg will be brought in contact with the surface or roadway upon a direct downward movement of the leg.

From the foregoing description, it is thought to be obvious that a tractor constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. A device of the character described including an endless member, a driving member operatively engaged therewith, legs engaged with said endless member, and means coacting with said legs for moving the same laterally relative to the endless member when in inoperative position.

2. A device of the character described including an endless member, a driving member operatively engaged therewith, legs engaged with said endless member, means coacting with said legs for moving the same laterally relatively to the endless member when in inoperative position, and means coacting with said legs for holding the same against lateral movement when in operative position.

3. A device of the character described comprising an endless member, a driving member operatively engaged therewith, a plate connected to the endless member, rollers carried by said plate, a separate endless trackway for each of the rollers whereby said plate is held against axial movement, and a ground engaging member carried by the plate.

4. A device of the character described comprising an endless member, a driving member operatively engaged therewith, a plate connected to the endless member, rollers carried by said plate, a separate trackway for each of the rollers whereby said plate is held against axial movement, a ground engaging member carried by the plate, and outstanding flanges carried by the plate between which the member is adapted to seat for holding said leg against movement.

5. A device of the character described comprising an endless member, a driving member operatively engaged therewith, a plate connected to the endless member, rollers carried by said plate, a separate endless trackway for each of the rollers whereby said plate is held against axial movement, a ground engaging member carried by the plate, and means for imparting lateral movement to the member relative to the endless member when the same is in inoperative position.

6. A device of the character described comprising an endless member, a driving member operatively engaged therewith, a plate connected to the endless member, rollers carried by said plate, a separate endless trackway for each of the rollers whereby said plate is held against axial movement, a ground engaging member carried by the plate, and means for holding the member against lateral movement relative to the endless member when in operative position.

7. A device of the character described comprising an endless member, a driving member operatively engaged therewith, a plate connected to the endless member, rollers carried by said plate, a separate trackway for each of the rollers whereby said plate is held against axial movement, a ground engaging member carried by the plate, and a rail arranged at one side of the plate and coacting with the member for holding the member against lateral movement when in operative position.

8. A device of the character described comprising an endless member, a driving member operatively engaged therewith, a leg pivotally engaged with the endless member, and means for laterally moving said leg about its pivot relative to the endless member when the same is in an elevated position.

9. A device of the character described comprising an endless member, a driving member operatively engaged therewith, legs engaged with said endless member and mounted for lateral movement relative to the endless member, an arm carried by each of the legs, and means co-acting with said arm for swinging the leg laterally relative to the endless member when said leg is in inoperative position.

In testimony whereof I hereunto affix my signature in the presence of two witnesses.

CHARLES P. DELO.

Witnesses:
P. H. SNYDER,
R. L. R. SNYDER.